US012568285B2

(12) United States Patent　　(10) Patent No.: US 12,568,285 B2

Kotagal et al.　　(45) Date of Patent:　　Mar. 3, 2026

(54) SYSTEM TO AUTO EQUALIZE THE AUDIO FREQUENCY FOR AN ENHANCED SOUND EXPERIENCE

(71) Applicant: International Business Machines Corporation, Armonk, NY (US)

(72) Inventors: Akshay Thyagaraja Kotagal, Bangalore (IN); Garima Kaushik, Kolkata (IN); Raghuraman Kalyanaraman, Round Rock, TX (US); Manjunath Ravi, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 18/469,919

(22) Filed: Sep. 19, 2023

(65) Prior Publication Data

US 2025/0097543 A1　　Mar. 20, 2025

(51) Int. Cl.
*G06F 3/16*　　(2006.01)
*H04N 21/485*　　(2011.01)
(Continued)

(52) U.S. Cl.
CPC ......... *H04N 21/8106* (2013.01); *G06F 3/165* (2013.01); *H04N 21/4852* (2013.01); *H04R 3/04* (2013.01)

(58) Field of Classification Search
CPC ..................... H04N 21/8106; H04N 21/4852; G06F 3/165; H04R 3/04
See application file for complete search history.

(56) References Cited

U.S. PATENT DOCUMENTS 7,095,455 B2　　8/2006　Jordan et al.
2009/0226152 A1*　9/2009　Hanes ................ H04N 21/4341
　　　　　　　　　　　　　　　　386/353
(Continued)

FOREIGN PATENT DOCUMENTS

CA　　　　1153702 A　　9/1983
CN　　113556604 A　　10/2021
(Continued)

OTHER PUBLICATIONS

Brad M. Johnson et al., "Environmentally Based Adaptive Sound System," IP.com, IP.com No. IPCOM000262178D, Dated: May 8, 2020, pp. 1-2.
(Continued)

*Primary Examiner* — Joseph Saunders, Jr.
(74) *Attorney, Agent, or Firm* — Patterson + Sheridan, LLP

(57) ABSTRACT

Techniques for dynamically and automatically equalizing audio content are provided. These techniques include receiving, in portions or as a whole, an instruction file that contains a plurality of instruction lines. Each one of the instruction lines correlates an equalizer setting instruction with a time frame of media content. The techniques further include automatically adjusting, as the media content is played, an equalizer setting of the equalizer according to the equalizer setting instruction that corresponds to the time frame of the media content being played at that time. Audio content is equalized in accordance with the equalizer setting, which is automatically adjusted as the media content is played according to the instruction file.

17 Claims, 7 Drawing Sheets

(51) Int. Cl.
    *H04N 21/81*       (2011.01)
    *H04R 3/04*       (2006.01)

(56)             References Cited

U.S. PATENT DOCUMENTS

| | | | |
|---|---|---|---|
| 2017/0032801 A1 * | 2/2017 | Baumgarte | ............. H04S 3/006 |
| 2017/0300289 A1 * | 10/2017 | Gattis | ................... G10L 19/018 |
| 2020/0403593 A1 | 12/2020 | Wang et al. | |

FOREIGN PATENT DOCUMENTS

| | | | |
|---|---|---|---|
| EP | 1631120 | A2 | 3/2006 |
| EP | 3108672 | B1 | 4/2018 |
| KR | 100647365 | B1 | 11/2006 |
| WO | 2020017732 | A1 | 1/2020 |

OTHER PUBLICATIONS

"The Complete Guide To Dynamic Equalization/EQ," mynewmicrophone.com, Date Accessed: Jul. 18, 2023, pp. 1-22.
"Dobly Advanced Audio v2," Dolby Professional, Date Accessed: Jul. 18, 2023, pp. 1-7 <https://professional.dolby.com/tv/dolby-advanced-audio-v2/.
Wayne Cunningham, "Dynamic EQ automatically adjusts bass and treble for optimal audio," CNET, Dated: Jan. 3, 2016, pp. 1-3.
Daniel Dixon, "When to Use Dynamic EQ in a Mix," iZOTOPE, Dated: Feb. 11, 2019, pp. 1-14.

* cited by examiner

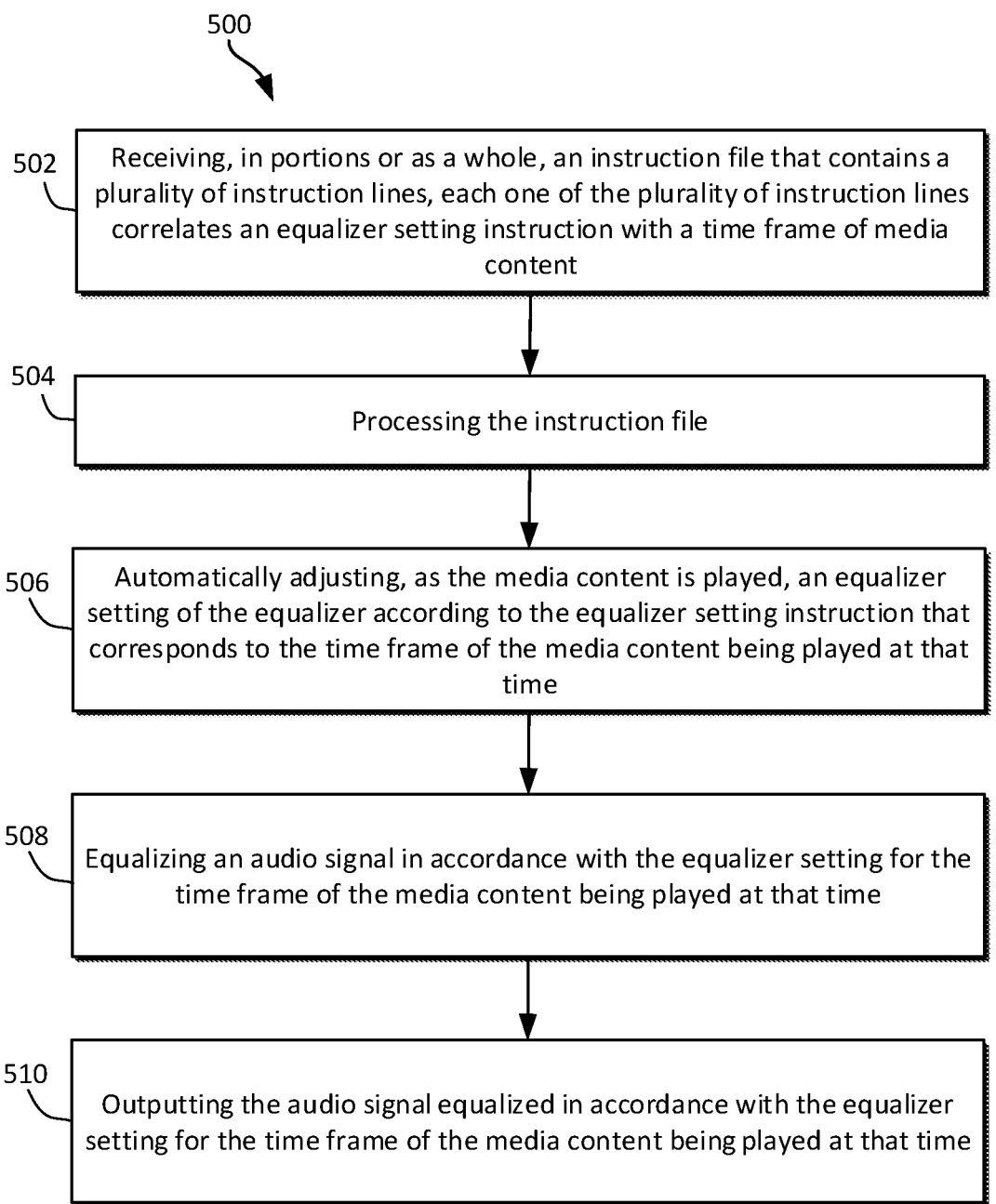

500

502 — Receiving, in portions or as a whole, an instruction file that contains a plurality of instruction lines, each one of the plurality of instruction lines correlates an equalizer setting instruction with a time frame of media content 504 — Processing the instruction file 506 — Automatically adjusting, as the media content is played, an equalizer setting of the equalizer according to the equalizer setting instruction that corresponds to the time frame of the media content being played at that time 508 — Equalizing an audio signal in accordance with the equalizer setting for the time frame of the media content being played at that time 510 — Outputting the audio signal equalized in accordance with the equalizer setting for the time frame of the media content being played at that time

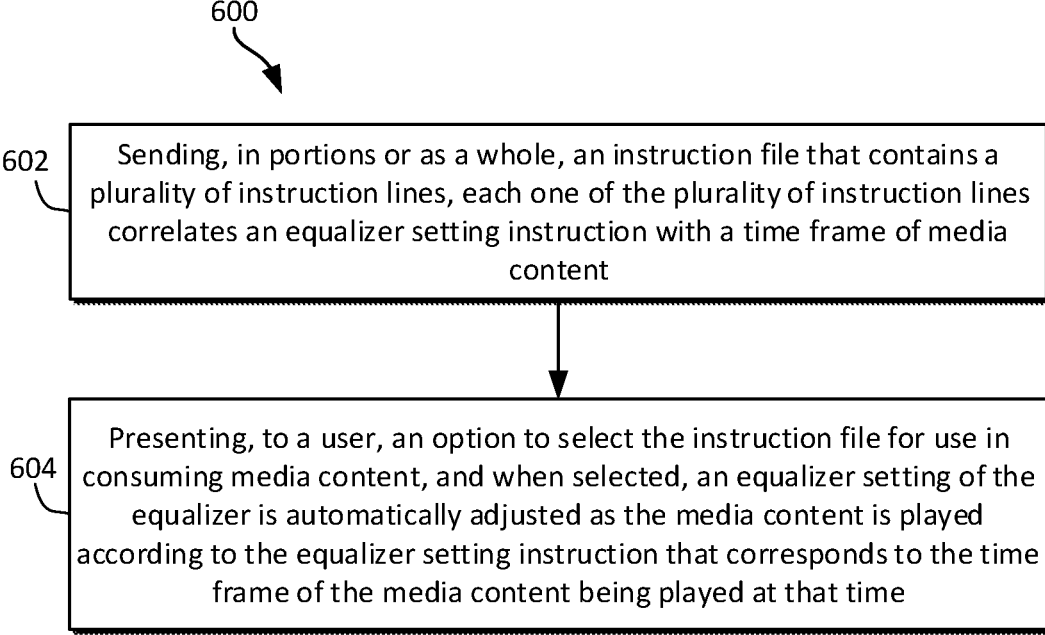

602 — Sending, in portions or as a whole, an instruction file that contains a plurality of instruction lines, each one of the plurality of instruction lines correlates an equalizer setting instruction with a time frame of media content 604 — Presenting, to a user, an option to select the instruction file for use in consuming media content, and when selected, an equalizer setting of the equalizer is automatically adjusted as the media content is played according to the equalizer setting instruction that corresponds to the time frame of the media content being played at that time

FIG. 10

SYSTEM TO AUTO EQUALIZE THE AUDIO FREQUENCY FOR AN ENHANCED SOUND EXPERIENCE

BACKGROUND

The present disclosure relates to sound enhancement techniques, and more specifically, to systems and methods of dynamically and automatically adjusting an equalizer setting of an equalizer as media content is played.

SUMMARY

According to one embodiment of the present disclosure, a method is provided. The method includes receiving a plurality of instruction lines, wherein each one of the plurality of instruction lines correlates an equalizer setting instruction with a time frame of media content. The method also includes automatically adjusting, as the media content is played, an equalizer setting of an equalizer according to the equalizer setting instruction that corresponds to the time frame of the media content being played at that time.

According to another embodiment of the present disclosure, a computer program product is provided. The computer program product includes a computer-readable storage medium having computer-readable program code embodied therewith, the computer-readable program code executable by one or more computer processors to cause the one or more computer processors to perform an operation, the operation includes: receiving a plurality of instruction lines, wherein each one of the plurality of instruction lines correlates an equalizer setting instruction with a time frame of media content; and automatically adjusting, as the media content is played, an equalizer setting of an equalizer according to the equalizer setting instruction that corresponds to the time frame of the media content being played at that time.

According to yet another embodiment of the present disclosure, a system is provided. The system includes one or more computer processors and a memory containing a program which when executed by the one or more computer processors performs an operation. The operation includes receiving a plurality of instruction lines, wherein each one of the plurality of instruction lines correlates an equalizer setting instruction with a time frame of media content; and automatically adjusting, as the media content is played, an equalizer setting of an equalizer according to the equalizer setting instruction that corresponds to the time frame of the media content being played at that time.

According to a further embodiment of the present disclosure, a method is provided. The method includes sending, in portions or as a whole, an instruction file that contains a plurality of instruction lines, each one of the plurality of instruction lines correlates an equalizer setting instruction with a time frame of media content. The method also includes presenting, to a user, an option to select the instruction file for use in consuming media content, and when selected, an equalizer setting of the equalizer is automatically adjusted as the media content is played according to the equalizer setting instruction that corresponds to the time frame of the media content being played at that time.

BRIEF DESCRIPTION OF THE DRAWINGS

FIG. 9 provides a flow diagram for a method of dynamically equalizing audio of media content according to an instruction file according to one or more embodiments of the present disclosure.

FIG. 10 provides a flow diagram for a method according to one or more embodiments of the present disclosure.

DETAILED DESCRIPTION

Figure 1:
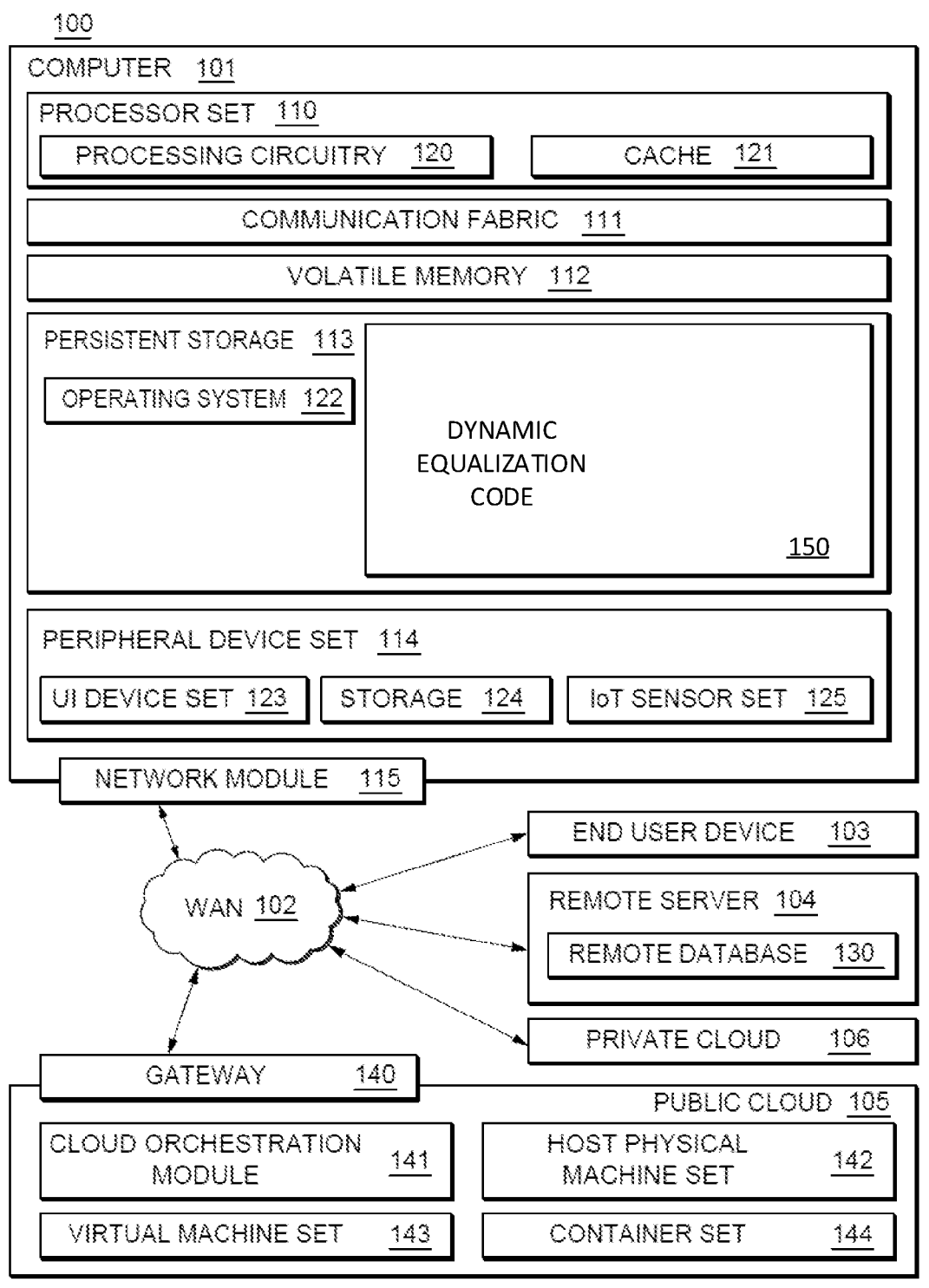
FIG. 1 illustrates a computing environment for dynamic and automatic equalization of audio signals according to one or more embodiments of the present disclosure.

Conventionally, when a user watches a movie or listens to a recorded music album, a preset equalizer setting (e.g., "Rock", "Pop", "Jazz", "Theatre", "Movie", "Stadium", etc.) is set at the beginning and left unchanged for a duration of the movie or album. While a preset equalizer setting can be used by an equalizer to provide an excellent sound experience for some aspects of a movie or album, the preset equalizer setting may provide a less than satisfactory sound experience for other aspects of the media content. For instance, a "Jazz" preset equalizer setting may provide an excellent sound experience for a jazz club scene in a movie, but might be less than ideal for a car chase scene. Preset equalizer settings have traditionally only been changeable manually, e.g., by a user turning a knob. With these challenges, user sound experiences may be less than optimal.

One or more techniques disclosed herein allow for dynamic and automatic adjustment of an equalizer setting as media content is played. The equalizer setting can be dynamically and automatically adjusted in accordance with an instruction file that provides instructions for how to set the equalizer setting for a given time frame of the media content. This allows the equalizer setting to dynamically change for each time frame rather than having to listen to the entire media content with the same single equalizer setting. Accordingly, audio signals of the media content can be equalized in accordance with the dynamically and automatically changing equalizer setting throughout the duration of media content to provide an enhanced sound experience for the user. In addition to providing enhanced sound experiences, the present techniques allow for sound engineers, music directors, content creators, etc. to create instruction files that allow for their creativity to be fully experienced by users, which can provide a rewarding creation experience. An instruction file can be created for any media content having an audio aspect.

This enhanced equalizer ability can be implemented by audio receivers (or equalizers thereof) configured to process such instruction files and implement their instructions to dynamically and automatically adjust the equalizer setting as media content is played, which can result in a dynamic audio experience relative to traditional experiences. If an audio receiver (or equalizer thereof) is not configured with such abilities, such an audio receiver can work as presently configured (e.g., with its current preset equalizer settings) or can be upgraded with software and/or hardware to obtain such abilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment for dynamic and automatic equalization of audio signals according to one embodiment. Computing environment 100 contains an example of an environment for the execution of at least some of the computer code involved in performing the inventive methods, such as dynamic equalization code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
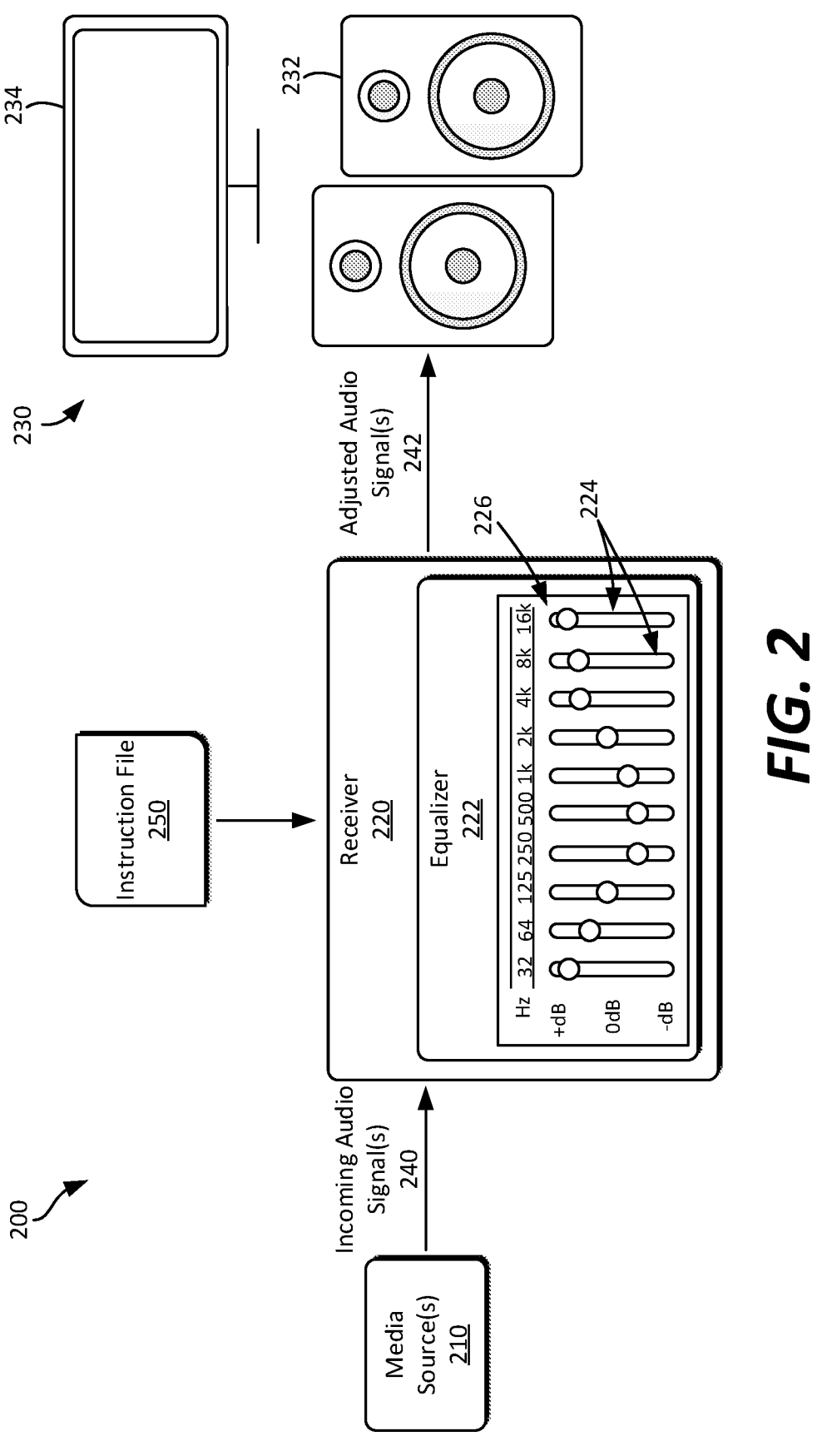
FIG. 2 is a diagram of a system according to one or more embodiments of the present disclosure.

With reference now to FIG. 2, a diagram of an example system 200 according to one or more embodiments of the present disclosure is provided. For the depicted embodiment of FIG. 2, the system 200 includes a media source 210, a receiver 220, and one or more media output devices 230.

The media source 210 provides media content (e.g., songs, movies, telecasts, broadcasts, video-on-demand, streamed content, etc.) to be played on the media output devices 230. The media source 210 can be, without limitation, DVDs, CDs, records, streaming platforms, podcasts, screencasts, social media, online applications, etc. The media content provided by the media source 210 includes at least one or more audio signals, but can also include one or more visual signals depending on the media content.

As shown in FIG. 2, incoming audio signals 240 from the media source 210 can be received by the receiver 220. The receiver 220 is generally configured to receive and process the incoming audio signals 240. Particularly, the receiver 220 includes an equalizer 222. The equalizer 222 can be a digital equalizer, for example. The equalizer 222 is operable to adjust a frequency response of the incoming audio signals 240, e.g., according to an equalizer setting. Accordingly, the receiver 220, or equalizer 222 thereof, can output adjusted audio signals 242, which can be routed to audio output devices (e.g., one or more speakers 232) of the media output devices 230. The speakers 232 and/or other audio output devices can present the audio aspect of the media content, or rather, audio outputs or sounds. The receiver 220 can also receive visual signals, if applicable, and can route the visual signals to one or more image display devices (e.g., a TV 234, monitor, projector, etc.) of the media output devices 230. The TV 234 and/or other image display devices can display the visual aspect of the media content.

The equalizer 222 can include one or more defined frequency ranges or equalizer bands 224. The equalizer 222 of FIG. 2 is shown having ten (10) equalizer bands 224, e.g., a 32 Hz band, a 64 Hz band, a 125 Hz band, a 250 Hz band, a 500 Hz band, a 1 kHz band, a 2 kHz band, a 4 kHz band, an 8 kHz band, and a 16 kHz band. In other embodiments, however, the equalizer 222 can include more or less than ten (10) equalizer bands, such as twelve (12) equalizer bands. Specific frequencies can be set for each equalizer band 224, and the specific frequencies can be adjusted. That is, a frequency amplitude or gain of each equalizer band 224 can be adjustable. Increasing the gain of a given equalizer band can "boost" the frequency range associated with the given equalizer band in the audio signal, or rather, increase the volume or intensity of the given equalizer band in the audio signal. In contrast, decreasing the gain of a given equalizer band can "cut" the given equalizer band in the audio signal, or rather, decrease the volume or intensity of the given equalizer band in the audio signal. An equalizer setting 226 can provide a "snapshot" of the gains or frequency amplitudes of the various equalizer bands 224. That is, the equalizer setting 226 can collectively describe the specific frequencies set for the equalizer bands 224. If one or more of the gains of the equalizer bands 224 is/are adjusted, a different equalizer setting would result.

In accordance with inventive aspects of the present disclosure, techniques are provided herein for dynamically and automatically adjusting an equalizer setting of the equalizer 222 in accordance with an instruction file 250. The techniques provided herein allow for the equalizer setting to dynamically change as media content is played (e.g., on a frame-by-frame basis if desired) rather than a single preset equalizer setting being used for a duration of the media content. As one example, instead of the audio aspect of a movie being equalized according to a single preset equalizer setting (e.g., "Movie 1"), the equalizer setting can be dynamically changed throughout the movie according to instructions provided in the instruction file 250. In this way, the sound presented to a user can be tailored to the various movie scenes, which can provide for an enhanced sound experience. As illustrated in FIG. 2, the receiver 220 (e.g., an audio driver of the receiver 220 or the equalizer 222 thereof), can receive, in portions or as a whole, the instruction file 250 that contains a plurality of instruction lines.

Figure 3:
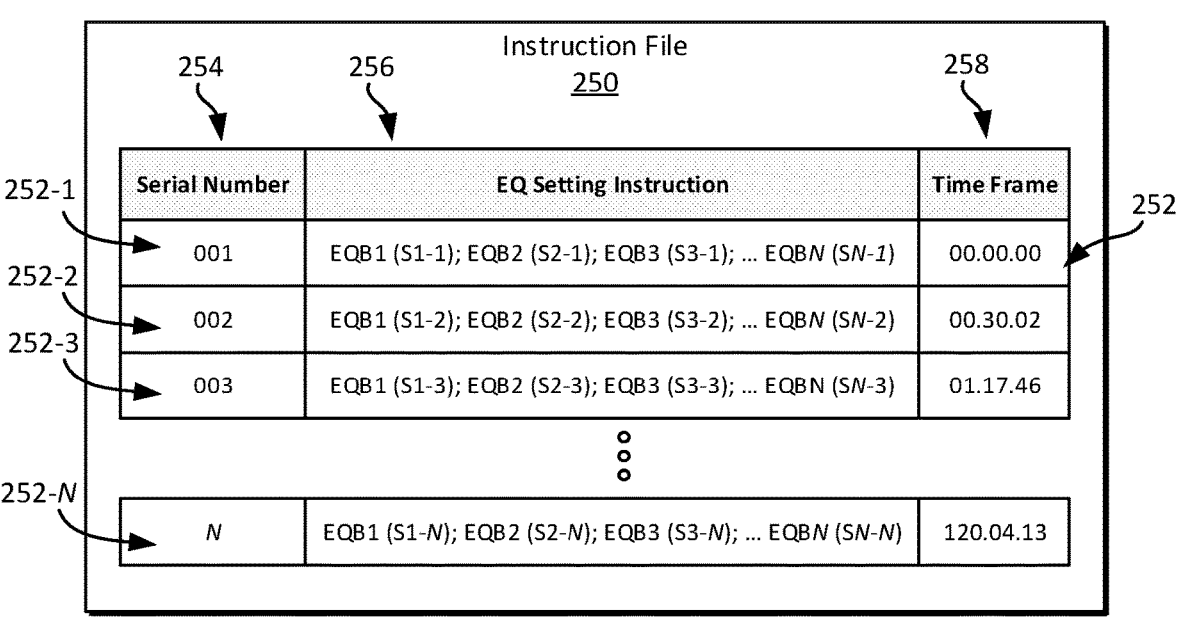
FIG. 3 is a diagram of an instruction file according to one or more embodiments of the present disclosure.

With reference now to FIGS. 2 and 3, FIG. 3 depicts the instruction file 250 containing a plurality of instruction lines 252. Each one of the instruction lines 252 includes a serial number 254. The serial number 254 functions as an identifier of a given instruction line. The serial numbers 254 can be ordered sequentially, e.g., 1, 2, 3, and so on to identify the various instruction lines 252. For the depicted embodiment of FIG. 3, a first instruction line 252-1 corresponds with a serial number "001", a second instruction line 252-2 corresponds with a serial number "002", a third instruction line 252-3 corresponds with a serial number "003", and so on as represented by an Nth instruction line 252-N corresponding with a serial number "N", wherein N is an integer greater than one (1).

Each one of the instruction lines 252 correlates an equalizer setting instruction 256 with a time frame 258 of media content. Each instruction line 252 can correlate an equalizer setting instruction 256 with a different or non-overlapping time frame 258 of the media content. Each equalizer setting instruction 256 instructs the equalizer 222 how to configure or set the frequencies (e.g., the amplitudes or gains) of the equalizer bands 224 for a particular time frame 258 of the media content. For instance, for the first instruction line 252-1, the time frame 258 commences at "00.00.00" and the equalizer setting instruction 256 (labeled as "EQ Setting Instruction" in FIG. 3) can include a band setting (e.g., a gain setting) for each equalizer band 224, e.g., a band setting S1-1 for a first equalizer band EQB1, a band setting S2-1 for a second equalizer band EQB2, a band setting S3-1 for a third equalizer band EQB3, and so on as represented by a band setting SN-1 for an Nth equalizer band EQBN, wherein N is an integer greater than one (1).

For the second instruction line 252-2, the time frame 258 commences at "00.30.02" and the equalizer setting instruction 256 can include a band setting (e.g., a gain setting) for each equalizer band 224, e.g., a band setting S1-2 for the first equalizer band EQB1, a band setting S2-2 for the second equalizer band EQB2, a band setting S3-2 for the third equalizer band EQB3, and so on as represented by a band setting SN-2 for the Nth equalizer band EQBN. Notably, one, some, or all of the equalizer bands EQB1, EQB2, EQB3, and EQBN can have different band settings in the second instruction line 252-2 than in the first instruction line 252-1. In this regard, at least one of the band settings S1-2, S2-2, S3-2, SN-2 in the second instruction line 252-2 can be different than its respective band setting S1-1, S2-1, S3-1, SN-1 in the first instruction line 252-1.

For the third instruction line 252-3, the time frame 258 commences at "01.17.46" and the equalizer setting instruction 256 can include a band setting for each equalizer band 224, e.g., a band setting S1-3 for the first equalizer band EQB1, a band setting S2-3 for the second equalizer band EQB2, a band setting S3-3 for the third equalizer band EQB3, and so on as represented by a band setting SN-3 for the Nth equalizer band EQBN. One, some, or all of the equalizer bands EQB1, EQB2, EQB3, and EQBN can have different band settings in the third instruction line 252-3 than in the second instruction line 252-2. Accordingly, the band settings are customizable for each one of the plurality of instruction lines 252. Consequently, the equalizer setting 226 can be different from one time frame to the next, e.g., the equalizer setting set during the first time frame can be different than during the second time frame, the third time frame, or any other time frame of the media content. However, it is contemplated that a given equalizer setting can be used more than once during playing of media content.

Referring still to FIGS. 2 and 3, the equalizer 222 or an audio driver associated with the equalizer 222 can automatically adjust, as the media content is played, an equalizer setting of the equalizer 222 according to the equalizer setting instruction 256 that corresponds to the time frame 258 of the media content being played at that time. For instance, when media content begins to play at "00.00.00", the equalizer setting 226 can be set according to a first equalizer setting instruction {EQB1 (S1-1); EQB2 (S2-1); EQB3 (S3-1); . . . . EQBN (SN-1)} set forth in the first instruction line 252-1. Then, at "00.30.02", the instruction file 250 calls for the equalizer setting 226 to change. Particularly, the equalizer setting 226 can be set according to a second equalizer setting instruction {EQB1 (S1-2); EQB2 (S2-2); EQB3 (S3-2); . . . . EQBN (SN-2)} set forth in the second instruction line 252-2. Next, at "01.17.46", the instruction file 250 calls for yet another change in the equalizer setting 226. Particularly, the equalizer setting 226 can be set according to a third equalizer setting instruction {EQB1 (S1-3); EQB2 (S2-3); EQB3 (S3-3); . . . . EQBN (SN-3)} set forth in the third instruction line 252-3. The automatic adjustment of the equalizer setting 226 can continue, e.g., for the duration of the media content being played in accordance with subsequent instruction lines 252. In some embodiments, a granularity of the time frames 258 in the instruction file 250 is at a frame level of the media content. In this way, automatic adjustment of the equalizer setting 226 on a frame-by-frame basis of the media content can be enabled.

The frequencies (or gains) of the one or more equalizer bands 224 set according to the equalizer setting 226 for the time frame 258 of the media content being played at that time can be applied to the incoming audio signal 240, which causes adjustment of the incoming audio signal 240. The adjusted incoming audio signal, or adjusted audio signal 242, can be output from the equalizer 222. The adjusted audio signal 242 can be routed to, e.g., one or more of the audio output devices of the media output devices 230. That is, an audio signal can be equalized in accordance with the equalizer setting 226 for the time frame 258 of the media content being played at that time, and the audio signal equalized in accordance with the equalizer setting for the time frame of the media content being played at that time can be output, e.g., to the media output devices 230.

Although equalizer settings are described primarily herein as being dynamically and automatically adjustable based adjustment of one or more gains of the equalizer bands 224, an equalizer setting can also be dynamically and automatically adjustable by changing other aspects of the equalizer setting, such as by applying a low pass filter to one or more equalizer bands 224, applying a high pass filter to one or more equalizer bands 224, adjusting a Q factor (or ratio of center frequency to bandwidth), etc. Instructions for applying adjusting such aspects can be provided in the instruction file 250.

Figure 4:
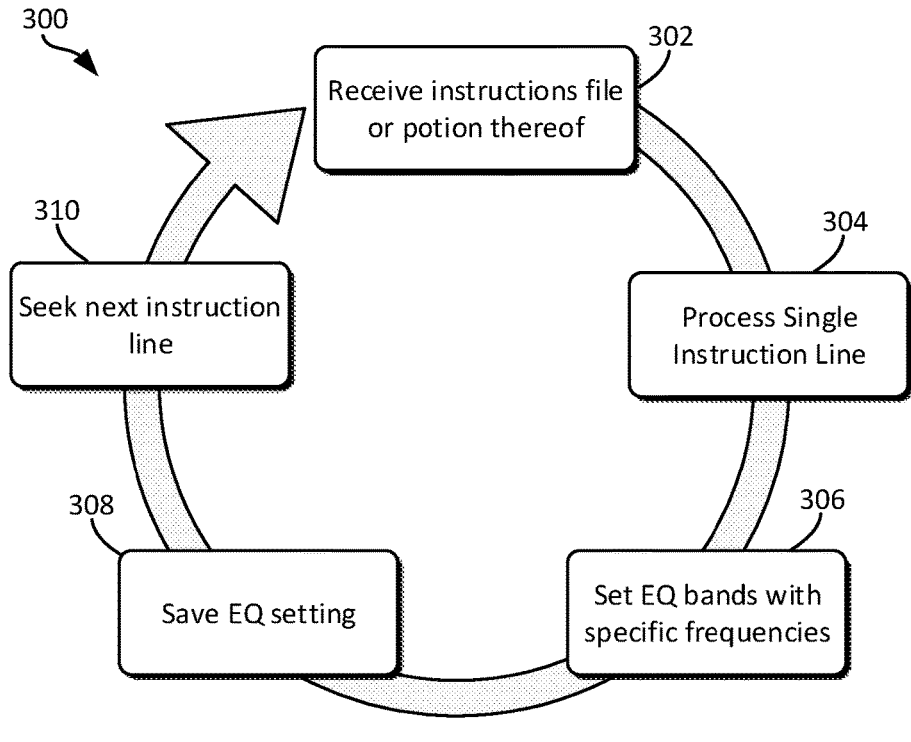
FIG. 4 is a timing diagram depicting an instruction file being sent to an equalizer in portions over time.

With reference now to FIGS. 2, 3, and 4, in some embodiments, the plurality of instruction lines 252 in the instruction file 250 can be processed (e.g., by the equalizer 222) in a line-by-line manner. FIG. 4 provides a flow diagram for a process 300 of processing the instruction lines 252 line-by-line in a sequential manner. At 302, the process 300 can include receiving the instruction file 250 or a portion thereof. At 304, the process 300 can include processing a single instruction line (e.g., the first instruction line 252-1 of FIG. 3) of the instruction file 250. The single instruction line is preferably processed prior to its associated time frame becoming active to ensure that the audio is enhanced for the entire duration of its associated time frame. At 306, based on the processing at 304, a frequency (or gain thereof) of each one of the equalizer bands 224 can be set according to the equalizer setting instruction 256 that corresponds to the time frame 258 of the media content to be played at a next time frame. One, some, or all of the frequencies set for the equalizer bands 224 at 306 can be different than the frequencies set in a previous iteration of the process 300.

At 308, with the frequencies (or gains thereof) of the one or more of the equalizer bands 224 set at 306, the equalizer setting 226 can be saved, e.g., to one or more non-transitory memory devices associated with the equalizer 222. Specifically, the frequencies (or gains thereof) set for the respective equalizer bands 224 can be collectively saved as a next equalizer setting. The saved frequencies (or saved gains) set for the one or more equalizer bands 224, or collectively the next equalizer setting, can be applied to an incoming audio signal 240 (FIG. 2) to adjust its frequency response when the next time frame becomes active. In this regard, the equalizer setting 226 of the equalizer 222 can be automatically adjusted according to the equalizer setting instruction 256 that corresponds to the time frame 258 of the media content being played at that time. The equalizer setting 226 can be automatically adjusted to the next equalizer setting when the next time frame of the media content becomes active or commences. At 310, the process 300 can include seeking a next instruction line to process. The process 300 can be iterated for a next instruction line where the single processing technique is applied as set forth above.

As one example application of the process 300 for processing the instruction file 250 of FIG. 3, during the time frame 258 that commences with "00.00.00", the process 300 can proceed with setting up the equalizer setting 226 for the next time frame, e.g., the time frame that commences with "00.30.02". Accordingly, a frequency (or gain) of each one of the equalizer bands 224 can be set at 306 according to the second equalizer setting instruction {EQB1 (S1-2); EQB2 (S2-2); EQB3 (S3-3); . . . . EQBN (SN-2)} that corresponds to the time frame 258 of the media content to be played at a next time frame, e.g., the time frame that commences with "00.30.02". One, some, or all of the frequencies (or gains) set for the equalizer bands 224 according to the second equalizer instructions {EQB1 (S1-2); EQB2 (S2-2); EQB3 (S3-3); . . . . EQBN (SN-2)} can be different than the frequencies (or gains) set in a previous iteration of the process 300, e.g., the frequencies (or gains) set for the equalizer bands 224 according to the first equalizer instructions {EQB1 (S1-1); EQB2 (S2-1); EQB3 (S3-1); . . . . EQBN (SN-1)}. The frequencies (or gains) set for the equalizer bands 224 at 306 according to the second equalizer setting instruction can be saved at 308, e.g., collectively as a next equalizer setting. Then, when the next time frame becomes active, e.g., at "00.30.02", the equalizer setting 226 of the equalizer 222 is automatically adjusted to the next equalizer setting. In this way, when the next time frame becomes active at "00.30.02", the equalizer setting 226 is automatically adjusted in accordance with the second equalizer setting instruction {EQB1 (S1-2); EQB2 (S2-2); EQB3 (S3-3); . . . . EQBN (SN-2)}.

Moreover, for a first time frame of media content, the first instruction line is preferably processed according to the process 300 prior to the first time period becoming active. For instance, for the instruction file 250 of FIG. 3, the first instruction line 252-1 can be processed prior to "00.00.00" so that the equalizer setting 226 can be set and saved according to the first equalizer setting instruction {EQB1 (S1-1); EQB2 (S2-1); EQB3 (S3-1); . . . . EQBN (SN-1)} and ultimately applied to the incoming audio signal 240 at the beginning of the time frame starting at "00.00.00".

In some embodiments, the instruction file 250 can be received as a whole file, e.g., in a single download. For instance, when a movie is downloaded to a device for viewing, the instruction file 250 can be downloaded at the same time as a whole file. The instruction file 250 can be embedded within the downloaded movie file or can be downloaded as a separate file. In this regard, the instruction file 250 can be a standalone file or embedded within another file associated with the media content.

Figure 5:
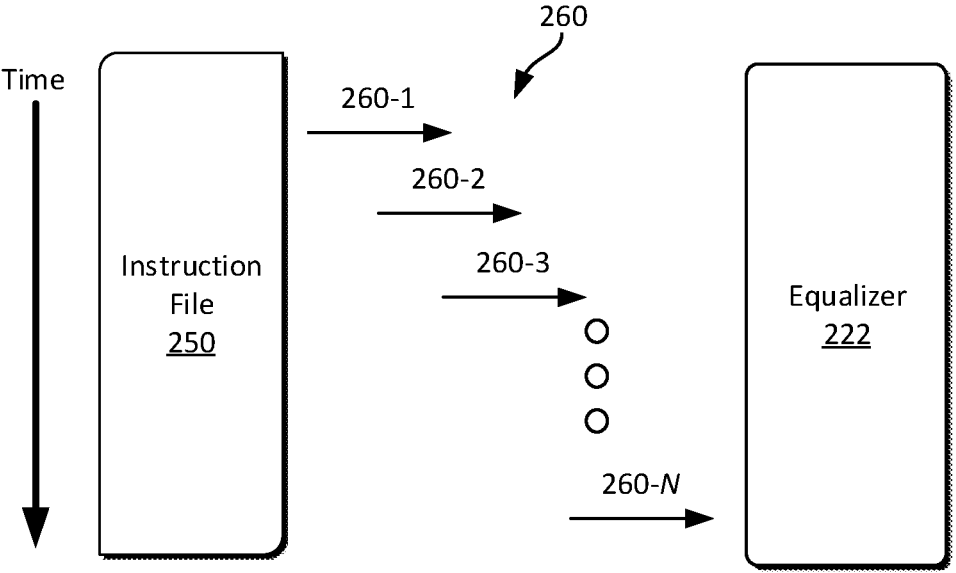
FIG. 5 is a timing diagram depicting an instruction file being received in portions over time.

In some other embodiments, the instruction file 250 can be received in portions, e.g., in the form of a plurality of data packets received over time. For instance, with reference to FIGS. 2 and 5, FIG. 5 provides a timing diagram depicting the instruction file 250 being received by the equalizer 222 in portions, or in a plurality of separate data packets 260, over time. As illustrated, a first portion of the instruction file 250 can be received by the equalizer 222 in a first data packet 260-1, a second portion of the instruction file 250 can be received by the equalizer 222 in a second data packet 260-2, a third portion of the instruction file 250 can be received by the equalizer 222 in a third data packet 260-3, and so on as represented by an Nth data packet 260-N being received by the equalizer 222, wherein N is an integer greater than one (1). The equalizer 222 can receive these various data packets 260 over time, e.g., as part of streamed media content. In some embodiments, the plurality of data packets 260 can be received at a predetermined time interval, e.g., every millisecond, every second, every five minutes, etc. In yet other embodiments, the plurality of data packets 260 can be received based at least in part on a total time of the time frames in the last data packet received. For instance, a data packet can include one or more instruction lines, which each have an associated time frame. The time period of each time frame received in the data packet can be summed to render a total time. As one example, when the total time is less than a threshold time, at the start or as counted down, a new data packet with additional instruction lines can be sent to and received by the equalizer 222.

In yet other embodiments, the equalizer 222 can receive multiple instruction files associated with media content (e.g., multiple instruction files associated with a particular movie), including at least a first and a second instruction file, and can automatically select which of these instruction files to use for automatically adjusting the equalizer setting as the media content is played. In some example embodiments, a machine-learned model associated with an equalizer can learn the habits, behavior, and/or preferences of a user (or multiple users), and based on such learned preferences, the instruction file to be used for automatically adjusting the equalizer setting as the media content is played can be automatically selected. As one example, a user may prefer an instruction file created by the sound engineer that originally mastered or produced the audio aspect of the media content. As another example, a user may prefer an instruction file created by a particular sound engineer or third-party entity. As yet another example, users may prefer instruction files created by themselves. As noted, such preferences can be learned by a machine-learned model and an instruction file can be automatically selected accordingly.

Figure 6:
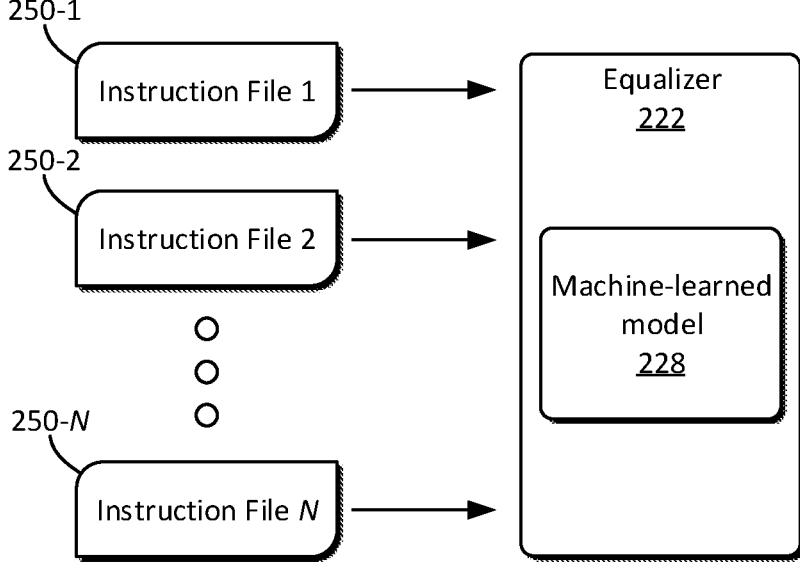
FIG. 6 provides a diagram showing an equalizer receiving multiple instruction files.

FIG. 6 provides a diagram showing the equalizer 222 receiving multiple instruction files. The equalizer 222 can receive a first instruction file 250-1 and a second instruction file 250-2. However, the equalizer 222 can receive more than two (2) instruction files as represented by an Nth instruction file 250-N, wherein N is an integer greater than one (1). The first and second instruction files 250-1, 250-2 can be received by the equalizer 222 in portions or as a whole. Each instruction file 250-1, 250-2 can contain a plurality of instruction lines, with each one of the plurality of instruction lines correlating an equalizer setting instruction with a time frame of the media content. In some embodiments, as provided above, the equalizer 222 can automatically select the first instruction file 250-1 or the second instruction file 250-2 (or some other instruction file) to use for automatically adjusting, as the media content is played, the equalizer setting of the equalizer 222 based at least in part on a machine-learned preference of the user. Particularly, a machine-learned model 228 associated with the equalizer 222 can learn the preferences of one or more users, and based at least in part on the preferences learned by the machine-learned model 228, the equalizer 222 can automatically select the first, second, or some other instruction file for automatically adjusting the equalizer setting as media content is played.

Figures 7, 8:
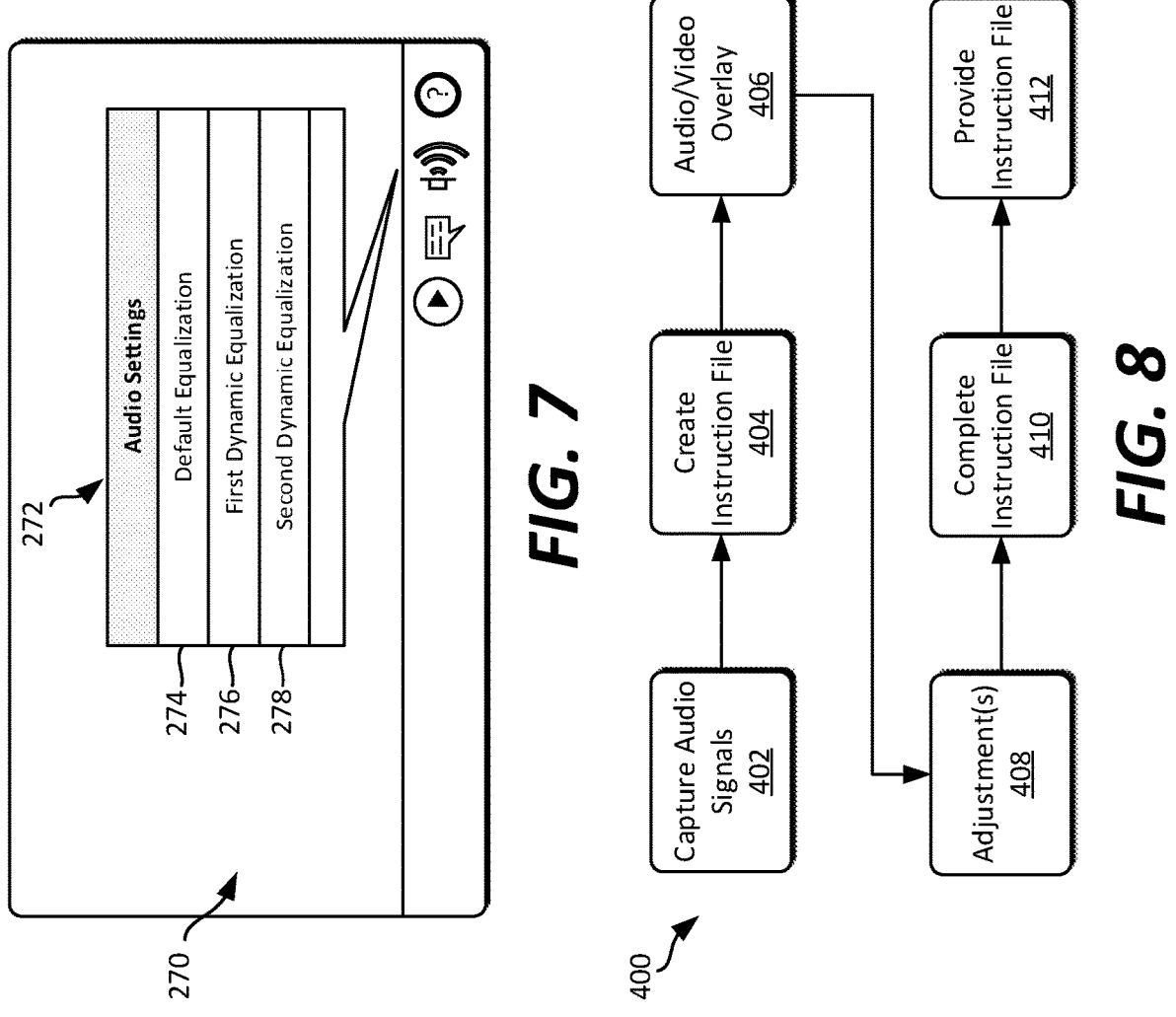
FIG. 7 depicts an example audio settings selection menu for a streaming application being presented to a user.
FIG. 8 provides a flow diagram for an example process of creating an instruction file according to one or more embodiments of the present disclosure.

In some further embodiments, an option to utilize an instruction file (or select one from a plurality of instruction files to use) in consuming media content can be presented to a user. By way of example, FIG. 7 depicts an example audio settings selection menu 272 for a streaming application 270, which can be presented to a user on a monitor, TV, tablet, phone, etc. As shown in FIG. 7, the audio setting selection menu 272 allows for a user to select a default equalization 274, a first dynamic equalization 276 corresponding to a first instruction file, or a second dynamic equalization 278 corresponding to a second instruction file. A user can scroll, hover over, or otherwise select the desired equalization. When a dynamic equalization is selected, the instruction file associated with the selected dynamic equalization can be used to dynamically and automatically equalize audio signals of media content according to the equalization setting instructions and time frames set forth in the instruction file.

FIG. 8 provides an example process 400 for creating an instruction file, e.g., for media content having audio and visual aspects, such as a movie or TV show. An instruction file can be created by a sound engineer or original author of the media content, a third-party entity, a user, or other creators. At 402, the process 400 can include capturing audio signals, e.g., during a live recording of a song performed by a singer, while actors are speaking during a scene, etc. Audio signals can be captured for each time frame of the media content. At 404, the process 400 can include creating the instruction file, which can be done independently of the visual aspect. The instruction file can be organized initially by time frame (e.g., based on the different visual scenes of the media content), and a creator can determine the desired gains or amplitudes of the frequencies for the various predefined equalizer bands for each time frame. For instance, preset equalizer settings (e.g., "Rock", "Pop", "Jazz", etc.) can be used initially as a starting point and a creator can adjust the frequencies (or gains) of one or more of the frequency bands from the preset equalizer settings to emphasize or deemphasize certain frequencies. At 406, the audio aspect, which can be equalized by an equalizer according to the instruction file, can be overlayed with the visual aspect of the media content to ensure cooperation between them.

At 408, adjustments to the instruction file can be made as needed. At 410, the instruction file can be completed. The completed instruction file can either be embedded along with the visual aspect in a single file or can be a standalone file. At 412, the completed instruction file can be provided, e.g., to a user's system by way of a download or streamed in portions. Once provided, the created instruction file can be used to dynamically and automatically equalize the audio aspect of the media content.

FIG. 9 provides a flow diagram for a method 500 of dynamically equalizing audio of media content according to an instruction file.

At 502, the method 500 can include receiving, in portions or as a whole, an instruction file that contains a plurality of instruction lines, each one of the plurality of instruction lines correlates an equalizer setting instruction with a time frame of media content. For instance, an equalizer of an audio receiver can receive the instruction file. In some implementations, the instruction file is received as a whole file, e.g., in a single download. In other implementations, the instruction file is received in portions in the form of a plurality of data packets received over time, e.g., as in when the media content is streamed. In such implementations, the plurality of data packets can be received at a predetermined time interval, e.g., every ten (10) seconds. In yet other implementations, the plurality of data packets can be received based at least in part on a total time of the time frames in the last data packet received, e.g., on an as-needed basis to provide sufficient time for processing a next instruction line. Each instruction line can correlate an equalizer setting instruction with a different or non-overlapping time frame of the media content.

At 504, the method 500 can include processing the instruction file received at 502. The instruction lines can be processed in a line-by-line manner, e.g., one at a time. A given instruction line can be processed by: setting a gain of one or more equalizer bands of the equalizer according to an equalizer setting instruction that corresponds to a next time frame of the media content; and saving the gains for the one or more equalizer bands for the next time frame of the media content. The saved gains set for the one or more equalizer bands can collectively form a next equalizer setting, which can be implemented as the equalizer setting at 506 when the next time frame becomes active or commences. For instance, the equalizer setting can be automatically adjusted to be the "next equalizer setting" when the "next time frame" of the media content commences or becomes active.

At 506, the method 500 can include automatically adjusting, as the media content is played, an equalizer setting of the equalizer according to the equalizer setting instruction that corresponds to the time frame of the media content being played at that time. For instance, the plurality of instruction lines can include a first instruction line and a second instruction line, the first instruction line correlates a first equalizer setting instruction with a first time frame of the media content and the second instruction line correlates a second equalizer setting instruction with a second time frame of the media content. The equalizer setting can be automatically adjusted according to the first equalizer setting instruction at commencement of the first time frame of the media content and automatically adjusted according to the second equalizer setting instruction at commencement of the second time frame of the media content. The equalizer setting is different during the first time frame than during the second time frame. In this regard, the equalizer setting is changed or adjusted from one time frame to the next.

In some implementations, a granularity of the time frames in the instruction file can be at a frame level of the media content so as to allow for automatic adjustment of the equalizer setting on a frame-by-frame basis of the media content. This level of granularity provides enhanced flexibility in tailoring sounds of media content.

At 508, the method 500 can include equalizing an audio signal in accordance with the equalizer setting for the time frame of the media content being played at that time. Stated another way, at 508, the method 500 can include applying the gains set for the one or more equalizer bands adjusted according to the equalizer setting for the time frame of the media content being played at that time so as to adjust an audio signal.

At 510, the method 500 can include outputting the audio signal equalized in accordance with the equalizer setting for the time frame of the media content being played at that time. Stated differently, at 510, the method 500 can include outputting the audio signal adjusted according to the equalizer setting at 508. For instance, the adjusted audio signal can be output by an equalizer to one or more audio output devices, e.g., speakers.

In some implementations, the method 500 can include presenting, to a user, an option to utilize the instruction file in consuming the media content. The option to utilize the instruction file in consuming the media content can be presented, e.g., as a selectable option on a display device or audibly. A user can select an option, e.g., by way of a remote or controller or by way of voice command.

In yet other implementations, the method 500 can include receiving, in portions or as a whole, a second instruction file that contains a plurality of second instruction lines, each one of the plurality of second instruction lines correlates an equalizer setting instruction with a time frame of the media content. The method 500 can also include automatically selecting the instruction file or the second instruction file to use for automatically adjusting, as the media content is played, the equalizer setting of the equalizer based at least in part on a machine-learned preference of the user.

FIG. 10 provides a flow diagram for a method 600.

At 602, the method 600 can include sending, in portions or as a whole, an instruction file that contains a plurality of instruction lines, each one of the plurality of instruction lines correlates an equalizer setting instruction with a time frame of media content. For instance, a streaming application can send the instruction file in portions (e.g., in various data packets) by way of a network (e.g., the internet). The instruction file can be received by a receiver, or equalizer or audio driver associated with the equalizer.

At 604, the method 600 can include presenting, to a user, an option to select the instruction file for use in consuming media content. When selected, an equalizer setting of the equalizer is automatically adjusted as the media content is played according to the equalizer setting instruction that corresponds to the time frame of the media content being played at that time. For instance, a streaming application can present a user with an option to select between the instruction file (e.g., in the form of a selectable equalization option) and some other equalization option, such as a default equalization option. FIG. 7 provides one example manner in which an instruction file (or multiple instruction files) can be presented to a user. When a user selects the instruction file, the audio of the media content is equalized in accordance with the selected instruction file, which can advantageously enhance the sound experience for the user.

In some instances, the option to select an instruction file occurs prior to the sending of the instruction file at 602. For example, in some implementations, the instruction file is only sent, in whole or in part, when a user selects the instruction file for use in consuming the media content. This may reduce congestion on a network and save memory space on a memory of a user's system, among other benefits.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a plurality of instruction lines, wherein each one of the plurality of instruction lines correlates an equalizer setting instruction with a time frame of media content, wherein the plurality of instruction lines are received in an instruction file, the instruction file is received in portions as a plurality of data packets received over time, wherein each of the plurality of instruction lines has an associated time period, and wherein receiving the plurality of instruction lines comprises:
      determining a total time based on summing time periods in multiple instruction lines in a last data packet received, and
      receiving the plurality of data packets based on at least the total time; and
   automatically adjusting, as the media content is played, an equalizer setting of an equalizer according to the equalizer setting instruction that corresponds to the time frame of the media content being played at that time.

2. The method of claim 1, wherein a granularity of the time frames is at a frame level of the media content so as to allow for automatic adjustment of the equalizer setting on a frame-by-frame basis of the media content.

3. The method of claim 1, further comprising:
   processing the plurality of instruction lines in a line-by-line manner, wherein a given instruction line of the plurality of instruction lines is processed by:
      setting a gain of one or more equalizer bands of the equalizer according to an equalizer setting instruction that corresponds to a next time frame of the media content; and
      saving the gains for the one or more equalizer bands for the next time frame of the media content, and
      wherein the saved gains set for the one or more equalizer bands collectively form a next equalizer setting, and wherein the equalizer setting is automatically adjusted to the next equalizer setting at the next time frame of the media content.

4. The method of claim 1, wherein the plurality of instruction lines are received in an instruction file, which is received as a whole file.

5. The method of claim 1, further comprising:

equalizing an audio signal in accordance with the equalizer setting for the time frame of the media content being played at that time; and outputting the audio signal equalized in accordance with the equalizer setting for the time frame of the media content being played at that time.

6. The method of claim 1, wherein the plurality of instruction lines include a first instruction line and a second instruction line, the first instruction line correlates a first equalizer setting instruction with a first time frame of the media content and the second instruction line correlates a second equalizer setting instruction with a second time frame of the media content, and wherein the equalizer setting is automatically adjusted according to the first equalizer setting instruction at commencement of the first time frame of the media content and automatically adjusted according to the second equalizer setting instruction at commencement of the second time frame of the media content, and wherein the equalizer setting is different during the first time frame than during the second time frame.

7. The method of claim 1, further comprising:

presenting, to a user, an option to utilize the plurality of instruction lines in consuming the media content.

8. The method of claim 1, further comprising:

receiving a plurality of second instruction lines, wherein each one of the plurality of second instruction lines correlates an equalizer setting instruction with a time frame of the media content, automatically selecting the plurality of instruction lines or the plurality of second instruction lines to use for automatically adjusting, as the media content is played, the equalizer setting of the equalizer based at least in part on a machine-learned preference of a user.

9. A computer program product, comprising:

a computer-readable storage medium having computer-readable program code embodied therewith, the computer-readable program code executable by one or more computer processors to cause the one or more computer processors to perform an operation, the operation comprising:

receiving a plurality of instruction lines, wherein each one of the plurality of instruction lines correlates an equalizer setting instruction with a time frame of media content, wherein the plurality of instruction lines are received in an instruction file, which is received in portions as a plurality of data packets received over time, wherein each instruction line of the plurality of instruction lines has an associated time period, and wherein receiving the plurality of instruction lines comprises:

determining a total time based on summing time periods in multiple instruction lines in a last data packet received, and receiving the plurality of data packets based on at least the total time; and automatically adjusting, as the media content is played, an equalizer setting of an equalizer according to the equalizer setting instruction that corresponds to the time frame of the media content being played at that time.

10. The computer program product of claim 9, wherein the operation further comprises:

equalizing an audio signal in accordance with the equalizer setting for the time frame of the media content being played at that time; and outputting the audio signal equalized in accordance with the equalizer setting for the time frame of the media content being played at that time.

11. The computer program product of claim 9, wherein the operation further comprises:

processing the plurality of instruction lines, wherein a given instruction line of the plurality of instruction lines is processed by:

setting a gain of one or more equalizer bands of the equalizer according to an equalizer setting instruction that corresponds to a next time frame of the media content; and saving the gains for the one or more equalizer bands for the next time frame of the media content, and wherein the saved gains set for the one or more equalizer bands collectively form a next equalizer setting, and wherein the equalizer setting is automatically adjusted to the next equalizer setting at the next time frame of the media content.

12. The computer program product of claim 11, wherein the plurality of instruction lines are processed line-by-line in a sequential manner.

13. The computer program product of claim 9, wherein the plurality of instruction lines include a first instruction line and a second instruction line, the first instruction line correlates a first equalizer setting instruction with a first time frame of the media content and the second instruction line correlates a second equalizer setting instruction with a second time frame of the media content, and wherein the equalizer setting is automatically adjusted according to the first equalizer setting instruction at commencement of the first time frame of the media content and automatically adjusted according to the second equalizer setting instruction at commencement of the second time frame of the media content, and wherein the equalizer setting is different during the first time frame than during the second time frame.

14. A system, comprising:

one or more computer processors; and a memory containing a program which when executed by the one or more computer processors performs an operation, the operation comprising:

receiving a plurality of instruction lines, wherein each one of the plurality of instruction lines correlates an equalizer setting instruction with a time frame of media content, wherein the plurality of instruction lines are received in an instruction file, which is received in portions as a plurality of data packets received over time, wherein each instruction line of the plurality of instruction lines has an associated time period, and wherein receiving the plurality of instruction lines comprises:

determining a total time based on summing time periods in multiple instruction lines in a last data packet received, and receiving the plurality of data packets based on at least the total time; and automatically adjusting, as the media content is played, an equalizer setting of an equalizer according to the equalizer setting instruction that corresponds to the time frame of the media content being played at that time.

15. The system of claim 14, wherein the operation further comprises:

equalizing an audio signal in accordance with the equalizer setting for the time frame of the media content being played at that time; and outputting the audio signal equalized in accordance with the equalizer setting for the time frame of the media content being played at that time.

16. The system of claim 14, wherein the operation further comprises:

processing the plurality of instruction lines, wherein a given instruction line of the plurality of instruction lines is processed by:

setting a gain of one or more equalizer bands of the equalizer according to an equalizer setting instruction that corresponds to a next time frame of the media content; and saving the gains for the one or more equalizer bands for the next time frame of the media content, and wherein the saved gains set for the one or more equalizer bands collectively form a next equalizer setting, and wherein the equalizer setting is automatically adjusted to the next equalizer setting at the next time frame of the media content.

17. The system of claim 14, wherein the plurality of instruction lines include a first instruction line and a second instruction line, the first instruction line correlates a first equalizer setting instruction with a first time frame of the media content and the second instruction line correlates a second equalizer setting instruction with a second time frame of the media content, and wherein the equalizer setting is automatically adjusted according to the first equalizer setting instruction at commencement of the first time frame of the media content and automatically adjusted according to the second equalizer setting instruction at commencement of the second time frame of the media content, and wherein the equalizer setting is different during the first time frame than during the second time frame.

* * * * *